(12) United States Patent
Miyamoto et al.

(10) Patent No.: US 8,173,896 B2
(45) Date of Patent: May 8, 2012

(54) FLUID-INSULATED ELECTRICAL APPARATUS

(75) Inventors: Takashi Miyamoto, Tokyo (JP); Takao Tsurimoto, Tokyo (JP); Manabu Yoshimura, Tokyo (JP); Yoshinori Shimizu, Tokyo (JP); Osamu Kisanuki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 493 days.

(21) Appl. No.: 12/505,589

(22) Filed: Jul. 20, 2009

(65) Prior Publication Data

US 2010/0206615 A1 Aug. 19, 2010

(30) Foreign Application Priority Data

Feb. 17, 2009 (JP) ................. 2009-033942

(51) Int. Cl.
*H01B 9/06* (2006.01)
*H02G 5/06* (2006.01)

(52) U.S. Cl. ............. 174/14 R; 174/17 GF; 174/24; 174/21 R; 361/612; 361/604; 361/618

(58) Field of Classification Search ............. 174/14 R, 174/17 LF, 24, 26 G, 17 R, 16.1, 16.2, 17 GF, 174/19, 21 R; 361/600, 601, 612, 604, 618, 641

See application file for complete search history.

(56) References Cited

U.S. PATENT DOCUMENTS

| | | | | |
|---|---|---|---|---|
| 3,898,367 A | * | 8/1975 | Nakata | 174/14 R |
| 4,064,353 A | * | 12/1977 | Bolin | 174/14 R |
| 4,084,064 A | * | 4/1978 | Bowman | 174/14 R |
| 4,085,807 A | * | 4/1978 | Bolin | 174/14 R |
| 4,335,268 A | * | 6/1982 | Dale | 174/14 R |
| 4,347,401 A | * | 8/1982 | Knudsen et al. | 174/14 R |
| 4,403,101 A | * | 9/1983 | Cookson | 174/14 R |

FOREIGN PATENT DOCUMENTS

| | | |
|---|---|---|
| JP | 54-086737 A | 7/1979 |
| JP | 55-167706 U | 12/1980 |
| JP | 5-015607 U | 2/1993 |

* cited by examiner

*Primary Examiner* — Angel R Estrada
(74) *Attorney, Agent, or Firm* — Buchanan Ingersoll & Rooney PC

(57) ABSTRACT

A fluid-insulated electrical apparatus includes a grounded tank which is an airtight metal vessel filled with an insulating fluid. A conductor to which a high voltage is applied is disposed in the grounded tank. A metal plate that is press-processed to have an inclined portion and a groove between adjacent head top portions is fixed to and electrically connected to an inner wall of the grounded tank.

25 Claims, 7 Drawing Sheets

FLUID-INSULATED ELECTRICAL APPARATUS

BACKGROUND OF THE INVENTION

1. Field of the Invention

The present invention relates to a fluid-insulated electrical apparatus in which an energization conductor is accommodated in a grounded tank filled with an insulating fluid such as gas or oil.

2. Description of the Related Art

A gas-insulated electrical apparatus is an example of an electrical apparatus that uses gas as an insulating medium. In a typical gas-insulated electrical apparatus, an energization conductor to which a high voltage is applied is placed inside a metal vessel. A gas insulated electrical apparatus is both highly reliable and stable because the metal vessel protects the energization conductor from any external factors and it is environmental-friendly as well.

However, there is a possibility that a foreign metal substance such as metal powder can invade the grounded tank in the process of assembling the gas insulated electrical apparatus. When a high voltage is applied to the energization conductor in a state in which a foreign metal substance exists inside the grounded tank, the foreign metal substance in the grounded tank moves up and down in a space between the grounded tank and the energization conductor at a cycle of several hertz (Hz). Presence of foreign metal substances in the grounded tank is not preferable in view of insulation of the gas insulated electrical apparatus, and it is one of the main factors that causes degradation of the withstanding voltage. A conventional apparatus that collects and traps foreign metal substances present in the grounded tank is described below.

Japanese Patent Application Laid-open No. S54-86737 discloses a conventional technique in which a conductor through which a high-voltage current flows is supported by an insulated spacer at the center of a grounded tank. This grounded tank is a pipe-shaped airtight metal vessel and it is filled with insulating gas. Moreover, a plurality of metallic materials is formed on a lower portion of an inner surface of the grounded tank in such a way that their inclined surfaces overlap each other. Each metallic material has a shape in which one end, which faces the energization conductor, is rounded, and the other end is fixed to the inner surface of the grounded tank.

After the gas insulated electrical apparatus is installed, a high voltage is applied between the conductor and the grounded tank in a normal use state. Any foreign metal substance that exists in the grounded tank gets electrically charged and begins to move, but any foreign metal substance that contacts the surface of any of the metallic materials falls along their inclined surfaces that overlap each other and is trapped in an area surrounded by the metallic materials. As a result, degradation of the withstanding voltage of the airtight gas insulated electrical apparatus can be prevented.

The conventional gas-insulated electrical apparatus has the following problems. In order to reduce the distortion of an electric field generated in the bottom of the grounded tank, the end of the metallic material that faces the energization conductor is rounded. However, an electric field is enhanced because of the rounding of the energization conductor, so that the electric field generated is distorted. As a result, the foreign metal substance reaches a portion of the head top portion in which the electric field is high, and as such, it becomes difficult to trap the foreign metal substance.

SUMMARY OF THE INVENTION

It is an object of the present invention to at least partially solve the problems in the conventional technology.

According to an aspect of the present invention there is provided a fluid-insulated electrical apparatus including a grounded tank; an energization conductor that is disposed in the grounded tank and electrically insulated from the grounded tank; and a trap member that is arranged on a lower inner surface of the grounded tank so as to be electrically connected to the grounded tank and traps a foreign metal substance. The trap member includes a head top portion of a flat plate shape which is formed along the inner surface and is adjacent to a groove portion; and an inclined portion which is connected to one end of the head top portion, is inclined relative to the head top portion, forms a Japanese character "︵"-shaped cross section together with the head top portion, and has a lower end portion which contacts the inner surface of the grounded tank.

According to another aspect of the present invention there is provided a fluid-insulated electrical apparatus including a grounded tank; an energization conductor that is disposed in the grounded tank and electrically insulated from the grounded tank; and a trap member that is arranged on a lower inner surface of the grounded tank so as to be electrically connected to the grounded tank and traps a foreign metal substance. The trap member includes an inclined portion which is formed to be bent downward by at least cutting and raising one metal plate disposed on the inner surface, contacts the inner surface of the grounded tank and extends in a central axis direction of the grounded tank; and a head top portion which is connected to an upper end of the inclined portion, is part of the metal plate which is not cut and raised, forms a Japanese character "︵"-shaped cross section together with the inclined portion, and is adjacent to a groove portion formed according to formation of the inclined portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a fluid-insulated electrical apparatus according to the present invention will be described in detail below with reference to the accompanying drawings. It should be appreciated that the present invention is not limited to the embodiments described below.

Figure 1:
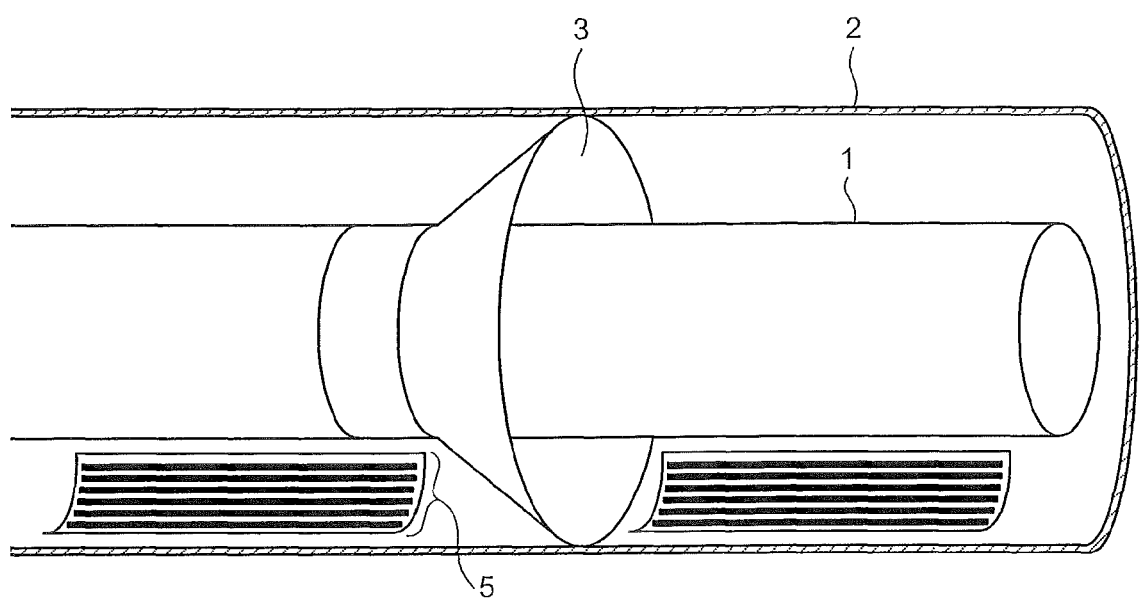
FIG. 1 is a perspective view of an internal configuration of a fluid-insulated electrical apparatus according to a first embodiment of the present invention.
Figure 2A:
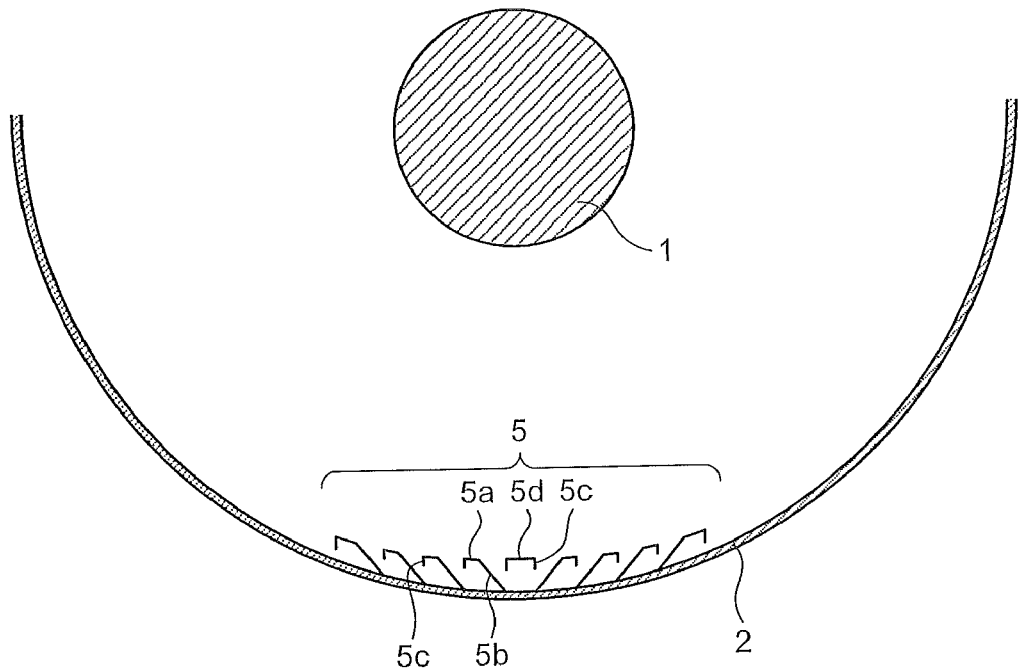
FIGS. 2A and 2B are front views of the fluid-insulated electrical apparatus shown in FIG. 1.
Figure 3A:
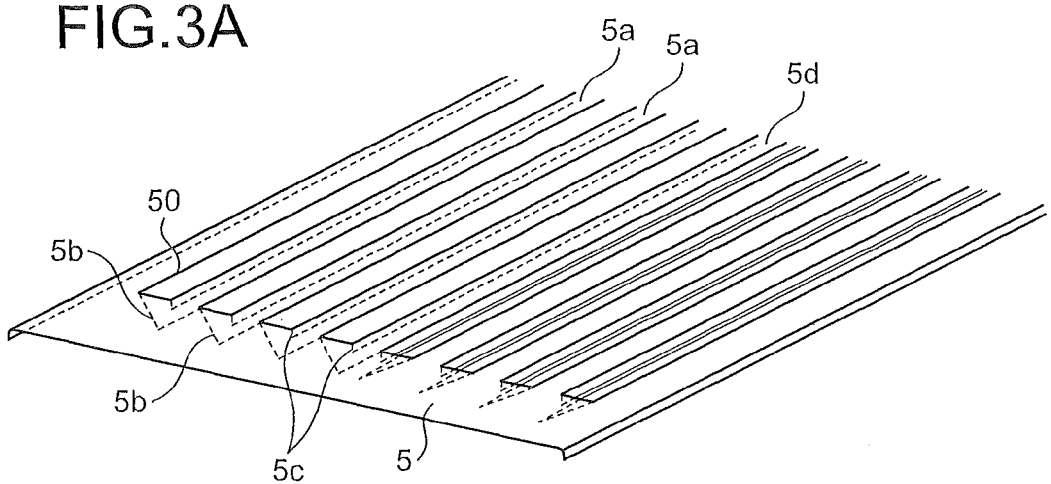
FIGS. 3A to 3C are perspective views of a trap apparatus shown in FIG. 1.
Figure 4:
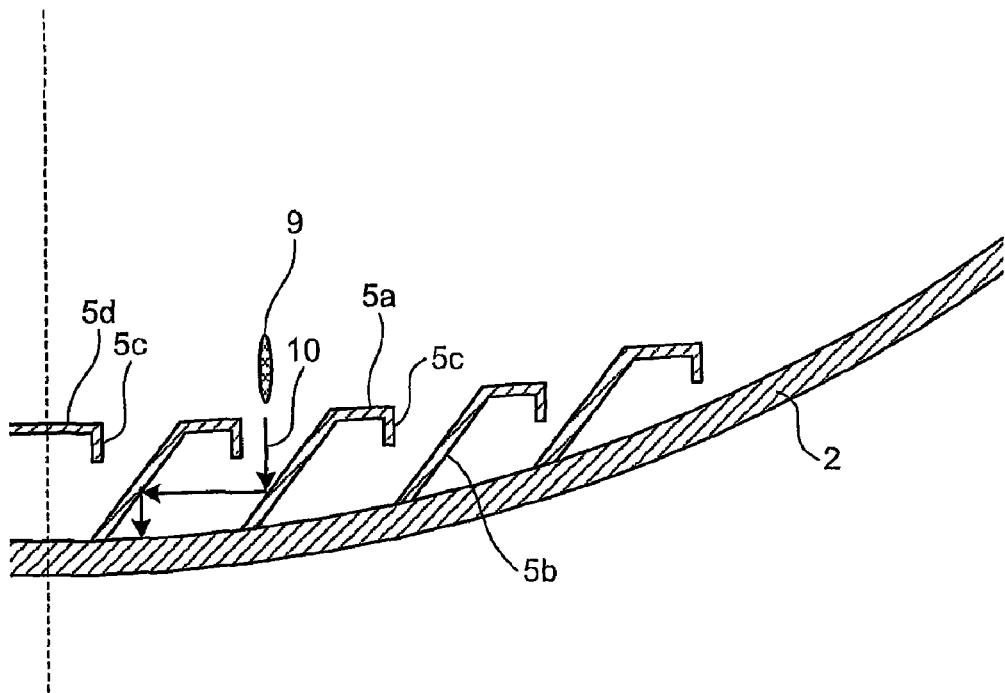
FIG. 4 is an enlarged front view of the trap apparatus shown in FIGS. 2A and 2B for explaining movement of a foreign metal substance in the trap apparatus.
Figure 5:
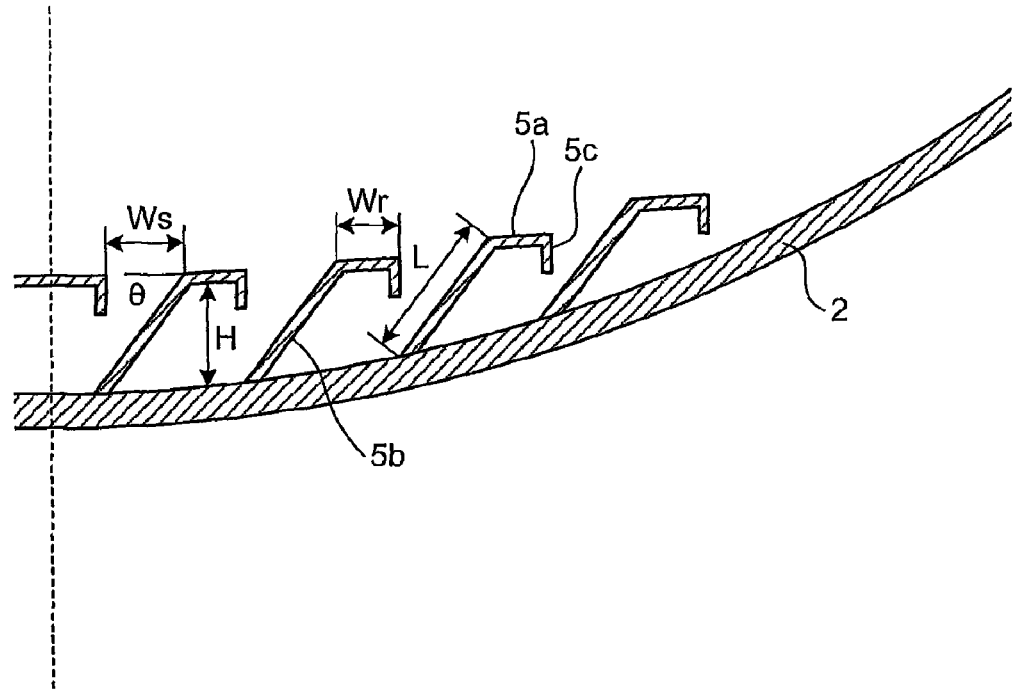
FIG. 5 is an enlarged front view of the trap apparatus shown in FIGS. 2A and 2B for explaining a groove width and height of the trap apparatus.

FIG. 1 is a perspective view of the internal configuration of a fluid-insulated electrical apparatus according to a first embodiment of the present invention and FIG. 2A is a front cross-sectional view of the fluid-insulated electrical apparatus shown in FIG. 1. FIG. 3A is a perspective view of a trap apparatus 5 shown in FIG. 1 and FIG. 4 is an enlarged front view of the trap apparatus 5 for explaining movement of a foreign metal substance in the trap apparatus 5. FIG. 5 is an enlarged front view of the trap apparatus 5 for explaining a groove width Ws, a width Wr of a head top portion 5a, a distance H between an inner wall of a grounded tank 2 and the head top portion 5a, a length L of an inclined surface 5b, and a bending angle θ in the trap apparatus 5.

As shown in FIG. 1, the fluid-insulated electrical apparatus includes the grounded tank 2, a conductor 1, an insulating spacer 3, and the trap apparatus 5. The grounded tank 2 is, for example, cylindrical in shape. The grounded tank 2 is an airtight metal vessel that is electrically grounded and it is filled with an insulating medium such as gas or oil. The conductor 1 extends along the central axis of the grounded tank 2 and it is supported by the insulating spacer 3. The insulating spacer 3 is formed from an insulating member. It has, for example, a bugle shape in which the conductor 1 is inserted into its center, and is supported by an inner wall of the grounded tank 2. The conductor 1 is an energization conductor to which a high voltage is applied.

As illustrated in FIGS. 1 and 2A, the trap apparatus 5 that is formed from a metal plate having a plurality of grooves, a plurality of head top portions and a plurality of inclined surfaces are disposed on a lower portion of an inner surface (that is, an inner bottom surface) of the grounded tank 2 as a trap member. The trap apparatus 5 includes a metal plate which is disposed to extend in parallel with the conductor 1 and an inner surface of the grounded tank 2 in a longitudinal direction (being the central axis direction) of the grounded tank 2, and part of the metal plate is bent downward relative to the grounded tank 2. That is, in the trap apparatus 5, there are formed, at least, a plurality of the inclined portions 5b which are cut and raised from one metal plate and bent downward and each of which has a lower end which contacts the inner surface, the head top portions 5a, each of which is a substrate portion of a flat plate shape which extends from an upper end of the inclined portion 5b and is almost in parallel with the inner surface; and sidewalls 5c, each of which is a sidewall portion which is formed at an end opposite to the end of the head top portions 5a which extend from the inclined portion 5b and are bent downward. A head top portion 5d that has the sidewalls 5c formed on both ends thereof is formed at the center of the circumferential direction of the trap apparatus 5.

The inclined portion 5b is formed by at least shearing and bending (cutting-and-raising) part of the metal plate as a substrate, and upwardly supports the head top portions 5a and 5d. The head top portion 5a is part of a substrate that forms a flat plate shape that is not sheared or bent (cut-and-raised). The inclined portion 5b is bent relative to the head top portion 5a in order to have an inclined surface. The cross-section formed by the head top portion 5a and the inclined portion 5b which extends from the head top portion 5a has a nearly Japanese character ⌒shape or a front-back reversed shape of the Japanese character ⌒As the inclined portion 5b is formed, a groove is formed between the head top portions 5a and 5d. Alternatively, the head top portions 5a and 5d are formed between grooves at both sides of each groove, and a plurality of grooves is formed along the circumferential direction of the grounded tank 2. Each of the inclined portions 5b, each of the head top portions 5a, each of the sidewalls 5c, and each of the grooves are elongated in one direction along the central axis direction of the conductor 1. The trap apparatus 5 is fixed to the inner wall of the grounded tank 2 using one or more screws so that the trap apparatus 5 is electrically connected to the grounded tank 2. The trap apparatus 5 can be fixed to the inner wall of the grounded tank 2 by some other technique such as soldering.

Figure 2B:
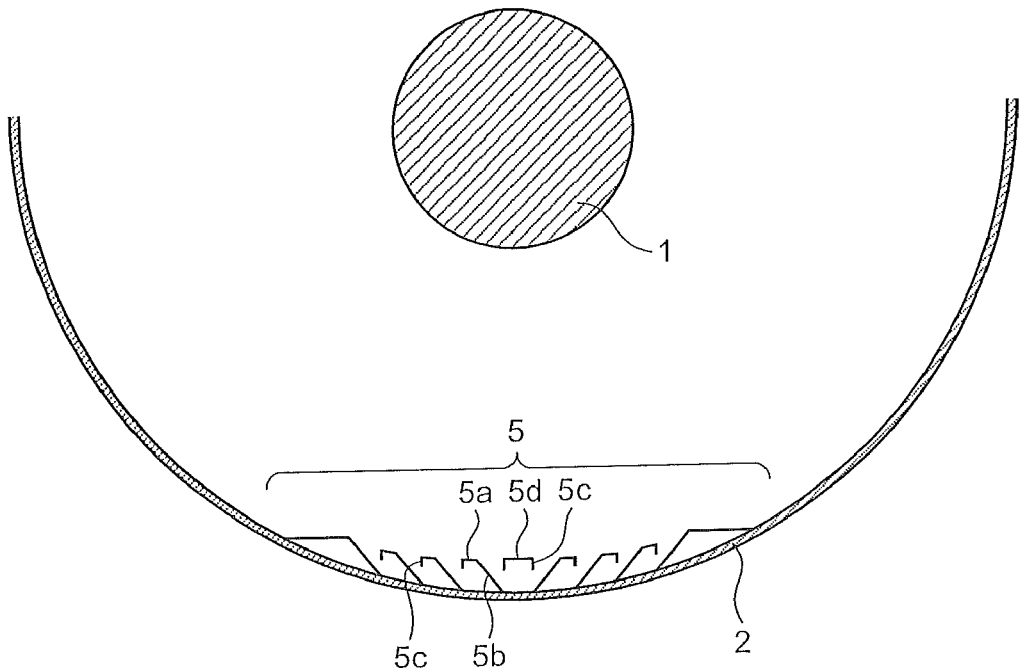

As illustrated in FIGS. 2A and 2B, the head top portion 5d which is located at the center (being the center of the direction orthogonal to the direction in which the conductor 1 is stretched) of the trap apparatus 5 is not connected to the inclined portion 5b at one of its ends unlike the other head top portions 5a, but has the sidewalls 5c at both its ends. The inclined portions 5b disposed at the left side of the head top portion 5d, which is disposed at the center, are almost in parallel with each other. Similarly, the inclined portions 5b disposed at the right side of the head top portion 5a, which is disposed at the center, are almost in parallel with each other. The inclined portions 5b disposed at the left side of the head top portion 5d, which is disposed at the center and the inclined portions 5b disposed at the right side thereof, are not in parallel with each other, but inclined at the same angle centered on the vertical direction, facing each other, and so are left-right symmetrically disposed centering on the head top portion 5a, which is disposed at the center.

FIG. 3A is a perspective view of the trap apparatus 5. As described above, in the first embodiment, the trap apparatus 5 is formed from a metal plate. FIG. 3A illustrates the trap apparatus 5 that includes the inclined portion 5b, the sidewall 5c, the head top portions 5a and 5d, and a groove 50, which is the groove portion formed between the adjacent head top portions 5a and 5d, and which is formed from one metal plate by the shearing and bending processes.

FIGS. 4 and 5 are enlarged cross-sectional front views of the trap apparatus 5 illustrated in FIGS. 2A and 3A. Ws denotes the groove width of the trap apparatus 5, Wr denotes the width of the head top portion 5a, H denotes the shortest distance between the inner wall of the grounded tank 2 and the head top portion 5a, L denotes the inclined surface length of the inclined portion 5b, and θ denotes the bending angle of the inclined portion 5b relative to the head top portion 5a. The sidewall 5c is almost perpendicular to the plane that forms the head top portion 5a. FIG. 4 illustrates a situation in which a foreign metal substance 9 drops along a foreign metal substance moving direction 10. When the foreign metal substance 9 drops in this way, it enters the groove in a vertical direction then moves in a horizontal direction, collides with the back surface of the adjacent inclined portion 5b and reaches the inner surface of the grounded tank 2. Thus, the foreign metal substance 9 is trapped within adjacent one of the inclined portion 5b. In FIGS. 4 and 5, adjacent ones of the inclined portions 5b do not overlap each other when seen from the top.

Next, how the foreign metal substance 9 moves within the grounded tank 2 will be described. The foreign metal substance 9 is a foreign substance such as metal powder mixed in the grounded tank 2. When a high voltage is applied to the conductor 1, the foreign metal substance 9 that contacts the inner wall of the grounded tank 2 becomes electrically charged. At this time, because a strong electric field exists in the grounded tank 2, an electrostatic force works on the electrically charged foreign metal substance 9, so that the foreign metal substance 9 levitates to a space in the grounded tank 2. The foreign metal substance 9 levitates toward the conductor 1 while oscillating in synchronization with a frequency that is commonly used for power in the case of an alternating current (AC) voltage, unlike a direct current (DC) voltage.

When the foreign metal substance 9 comes closer to the conductor 1, the electric charge on the foreign metal substance 9 is discharged, losing its charge, and drops below due to gravity while oscillating in synchronization with the frequency of the power that is commonly used, which is identical to that when it levitates. The falling foreign metal substance 9 contacts the grounded tank 2 and becomes electrically charged again, and once again levitates into the space. When the possibility that the foreign metal substance 9 exists between the grounded tank 2 and the conductor 1 is increased due to repetition of the above-described movement, a flashover occurs in that space, whereby there is a possibility that an accident may occur in the fluid-insulated electrical apparatus.

It is well known that needle-shaped foreign metal substances most affect the insulation durability of fluid-insulated electrical apparatuses. When a voltage is applied so that an electric field exceeds a certain value, foreign metal substances 9 that are in needle-shape stand up and levitate in an electric field direction at the slightest disturbance. The needle-shaped foreign metal substances 9 can move in a vertical direction in a standing state toward the conductor 1 or move in a vertical direction while performing a rotating movement in which the length of the longitudinal direction of the foreign metal substance 9 is its maximum diameter. Complicated movements of the foreign metal substances make them difficult to trap. The phenomenon whereby the foreign metal substance 9 mechanically repels the inner wall of the grounded tank 2 also makes it difficult to trap the foreign metal substance 9.

Figure 6A:
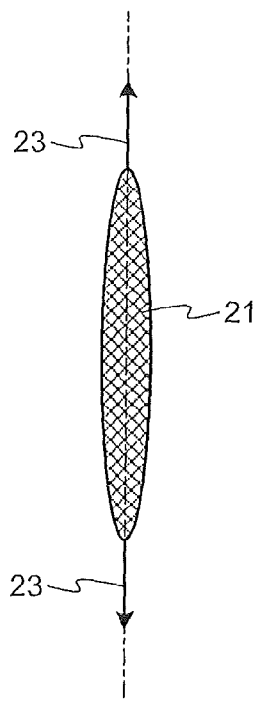
FIGS. 6A and 6B are schematic views for explaining movement of a foreign metal substance.
Figure 6B:
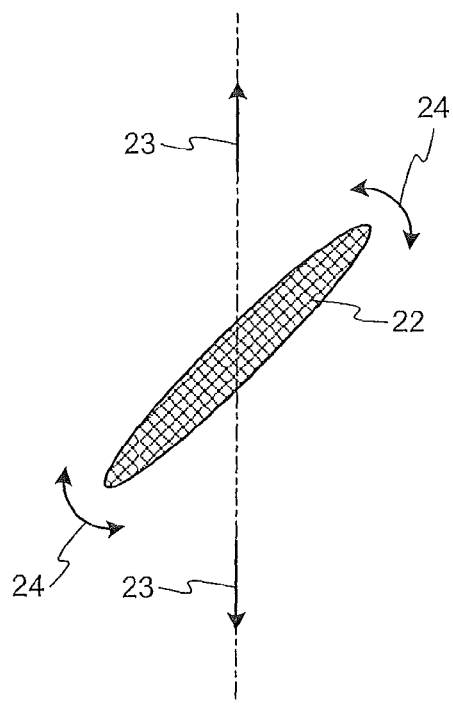

For the foregoing reasons, in the first embodiment, the groove width Ws of the trap apparatus 5 is set to a width greater than or equal to the length of the longitudinal direction of the foreign metal substance in view of the movement of the needle-shaped foreign metal substance 9, particularly for the rotation movement of the foreign metal substance 9. That is, because a typical size of the foreign metal substance typically mixed in the grounded tank 2 of typical fluid-insulated electrical apparatuses is already known, the trap apparatus 5 illustrated in FIGS. 1, 2A, 3A, 4 and 5 is configured using, as the groove width Ws, a width greater than or equal to the length of the longitudinal direction of the typical foreign metal substance, and thus it is possible to trap the foreign metal substance which moves in a vertical direction while performing a rotating movement where the length of its longitudinal direction is its maximum diameter. The movement of the foreign metal substance 9 in the vertical direction is transformed into a movement in the horizontal direction due to the inclined portion 5b, which is bent toward the inner surface of the grounded tank 2, as illustrated in FIG. 4, and thus the trap apparatus 5 can easily trap, in the grounded tank 2, a foreign metal substance 21 which moves in a vertical direction 23 in a standing state, as illustrated in FIG. 6A, and a foreign metal substance 22 which moves in the vertical direction 23 while performing a rotating movement (rotation direction 24), as illustrated in FIG. 6B.

Also, because an extremely low electric field is generated in the groove 50 by the shield effect of the sidewall 5c, when the foreign metal substances 21 and 22 contact the inclined portion 5b, their electrostatic charges can be easily discharged and their movement direction can be easily changed.

Figure 7:
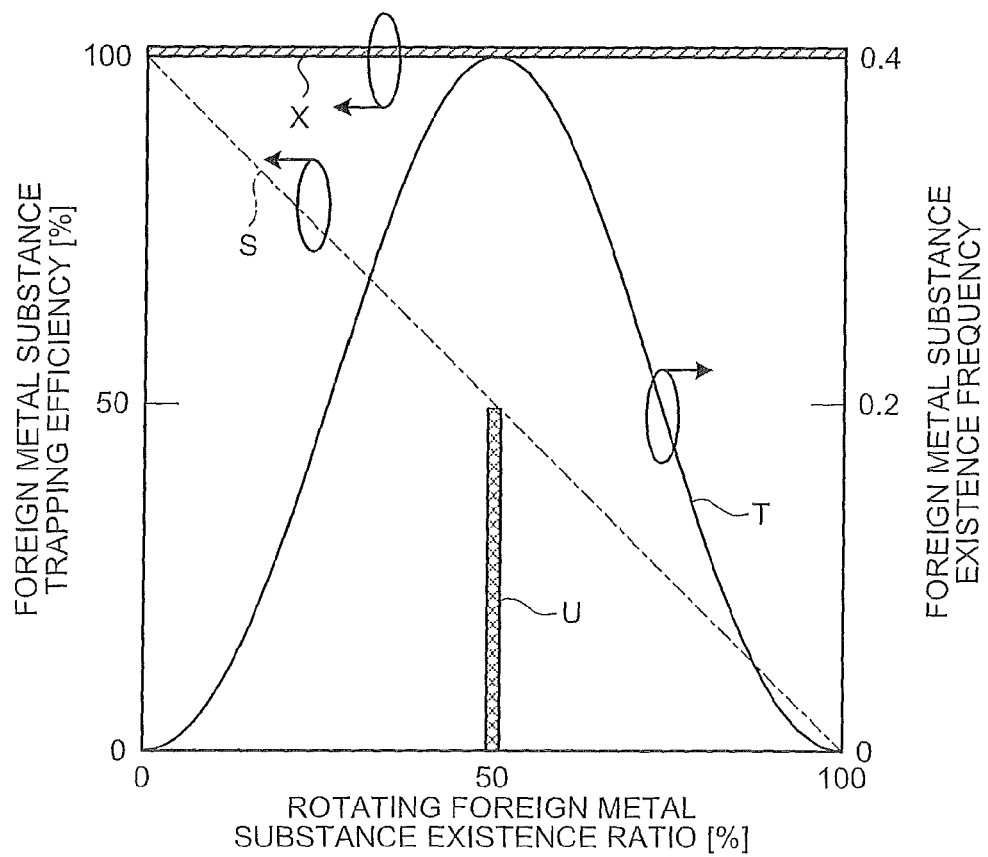
FIG. 7 is a graph illustrating the relationship between foreign metal substance trapping efficiency and a foreign metal substance existence ratio.

FIG. 7 is a graph illustrating the relationship between an existence ratio (%) of rotating foreign metal substances which exist in the grounded tank 2 and foreign metal substance trapping efficiency (%) (the vertical axis on the left), and the relationship between the existence ratio (%) of the rotating foreign metal substances and foreign metal substance existence frequency (the vertical axis on the right). The foreign metal substance existence frequency, i.e., the vertical axis on the right, represents an existence frequency (probability density) of the foreign metal substances that stand up and are rotating when the overall existence frequency of the foreign metal substances which exist in the grounded tank 2 is 1.

The foreign metal substance trapping efficiency of the trap apparatus 5, i.e., the vertical axis on the left, and the horizontal axis illustrates the existence ratio of the rotating foreign metal substances (the existence ratio of the standing foreign metal substances is 100% when the existence ratio of the rotating foreign metal substances is 0%). In FIG. 7, the straight line S represents the trapping efficiency of the conventional trap apparatus in which only trapping of a standing foreign metal substance is attempted, and when only standing foreign metal substances exist (when the existence ratio of the rotating foreign metal substances is 0%), all of the foreign metal substance can be trapped, but as the number of rotating foreign metal substances is increased, the number of foreign metal substances which do not enter the trapping groove is increased, so that the trapping efficiency is lowered to 0%.

Because an actual movement of the foreign metal substance in the grounded tank 2 is changed by a slight disturbance, the existence number of the foreign metal substances which stand up and are rotating can be regarded as representing a normal distribution, as indicated by the curve T shown in FIG. 7 (where the scale of the vertical axis of T is the foreign metal substance existence frequency to the right of the vertical axis). Also, because the state in which the existence ratio of the rotating foreign substances is 50% is probabilistically most likely to occur, the actual existence ratios of the rotating foreign metal substance and the standing foreign metal substance can be regarded as 50%. In FIG. 7, the foreign metal substance trapping efficiency of the conventional trap apparatus is represented by the straight line S, but the case in which the actual foreign metal substance trapping efficiency has a curved form can be considered, and thus the foreign metal substance trapping efficiency has a value where approximately 50% is the maximum, as indicated by the area U shown in FIG. 7.

Because the foreign metal substances which undergo different types of movements, respectively, exist in the grounded tank 2 as described above, by installing the trap apparatus 5 in which a groove which has a width greater than or equal to the maximum length of the foreign metal substance is formed in view of the movements as in the first embodiment, all of the foreign metal substances can be trapped at a foreign metal substance trapping efficiency of 100%, as indicated by the straight line X shown in FIG. 7, thereby preventing the possibility of a flashover accident. For example, the size of the foreign metal substance of the gas-insulated switching apparatus is commonly, for example, between 50 μm and 1000 μm in diameter and between 0.2 mm and 30 mm in length, and thus a high trapping effect for the foreign metal substance can be obtained by setting the groove width Ws of the trap apparatus according to the first embodiment to, for example, between 0.2 mm and 40 mm. In particular, for a foreign metal substance that is 50 μm in diameter and 20 mm in length, a groove width Ws of, for example, 25 mm is formed, whereby a high trapping effect can be obtained. On the contrary, for a foreign metal substance that is between 100 μm and 500 μm in diameter and between 0.7 mm and 15 mm in length, a groove width Ws of, for example, between 0.7 mm and 15 mm is formed, whereby a very high trapping effect can be obtained.

According to the first embodiment, because the head top portion 5a has a flat plate shape, distortion of an electric field which occurs as the end of the metallic material which faces the energization conductor is rounded, like the conventional art disclosed in Japanese Patent Application Laid-open No. S54-86737, can be reduced, and the foreign metal substance in the grounded tank can be efficiently trapped with a high degree of certainty, whereby the foreign metal substance becomes harmless, thereby preventing the withstanding voltage performance from deteriorating while simplifying the installation process.

According to the first embodiment, because the trap apparatus 5 includes a groove of a groove width Ws that is greater than or equal to the length of the longitudinal direction of the foreign metal substance 9, and the head top portion 5a and the inclined portion 5b are installed on the bottom surface of the grounded tank 2, both the rotating foreign metal substance and the standing foreign metal substance, which have different movements, are trapped in the groove, and the movements of the foreign metal substances are transformed from the vertical direction to the horizontal direction and are thereby induced to move into a low electric field area in which they cannot obtain a levitation force, whereby they become harmless. Because the foreign metal substance is efficiently trapped with a high degree of certainty, degradation of the withstanding voltage is prevented. In addition, because the trap apparatus 5 is formed using one metal plate, the installation process for attaching the trap apparatus 5 to the grounded tank is simplified and the trap apparatus 5 can be easily installed.

Because the shield effect of the area surrounded by the inner wall of the grounded tank 2, the inclined portion 5b, the head top portion 5a, and the sidewall 5c can be increased by forming the sidewall 5c, electrostatic charges can be easily discharged due to an extremely low electric field inside the area when the foreign metal substance contacts the inclined portion 5b, so that their movement direction can be easily changed. Therefore, the foreign metal substance can be efficiently accumulated and trapped with a high degree of certainty on the inner bottom surface of the grounded tank 2. Even in the case in which the sidewall 5c is not formed, the foreign metal substance can be trapped by the same shield effect, but a case in which the sidewall 5c is formed is more effective.

In the trap apparatus 5, a metal plate in which a plurality of grooves is formed can be disposed along part or all of an inner wall circumference of the grounded tank 2 including the inner bottom surface. Therefore, a plurality of grooves that transform the movement direction of a foreign metal substance exist, whereby the efficiency for trapping a foreign metal substance is easily improved. Also, the trap apparatus 5 can have at least one groove by forming at least two inclined portions 5b. In the first embodiment, an example in which the trap apparatus 5 is configured using one metal plate is described, and a plurality of grooves can be easily processed using the above-described method.

Figure 11A:
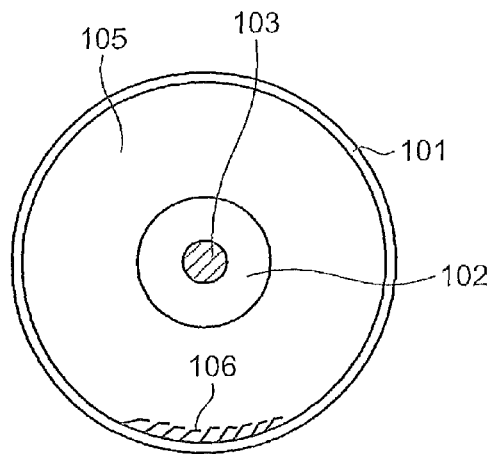
FIGS. 11A and 11B are views illustrating a configuration of a conventional airtight gas-insulated electrical apparatus disclosed in Japanese Patent Application Laid-open No. S54-86737.
Figure 11B:
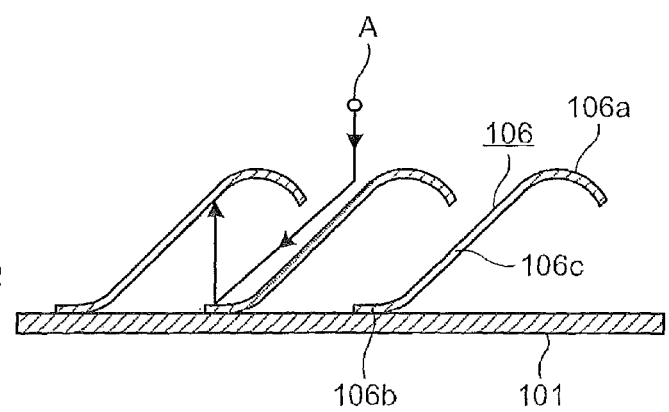

FIGS. 11A and 11B are views illustrating a configuration of the conventional airtight gas-insulated electrical apparatus disclosed in Japanese Patent Application Laid-open No. S54-86737. FIG. 11A is a cross-sectional view, and FIG. 11B is an explanatory view illustrating the powder dust trapping operation of a powder dust trapping metallic material. As shown in FIG. 11A, cylindrical-shaped charging portions 102 and 103 are disposed at the center of an airtight metal vessel 101 that configures the gas insulated electrical apparatus, and insulating gas 105 is injected into and sealed in the vessel 101. Powder dust trapping metallic members 106 are installed on the bottom of the vessel 101.

Each of the metallic members 106 has a shape in which one end portion 106a, which faces the charging portions 102 and 103, is rounded, the other end portion 106b is fixed to an inner bottom surface of the vessel 101, and an inclined surface 106c is formed between the one end portion 106a and the other end portion 106b. The inclined surfaces 106c of adjacent one of the metallic members 106 overlap each other as illustrated in FIG. 11B.

In the conventional gas-insulated electrical apparatus described above, one metallic member 106 alone is not sufficient to trap a foreign metal substance A. In other words, two or more metallic members 106 are required, whereby the process for installing the metallic members 106 becomes complicated. In contrast, according to the first embodiment, because the trap apparatus 5 is formed from one metal plate, the number of installation processes is reduced, and it is easy to install.

Also, the metallic members 106 overlap each other, and thus any movement of the foreign metal substance is mechanically suppressed in order to increase the trapping effect of the foreign metal substance A, but the entrance for inducing the foreign metal substance into the trapping area becomes narrow, so that it becomes difficult to trap a rotating needle-shaped foreign metal substance. However, in the present embodiment, rotating needle-shaped foreign metal substance can also be trapped. In an example illustrated in FIGS. 4 and 5, because the groove width Ws is set to a width that is greater than or equal to the length of the longitudinal direction of the foreign metal substance 9, the inclined portions 5b do not overlap each other.

Also, as shown in FIG. 11B, in order to reduce distortion of the electric field on the bottom surface of the vessel 101, the end portion 106a of the metallic member 106, which faces the charging portions 102 and 103, is rounded. However, an electric field is enhanced by rounding, so the electric field is distorted, and the foreign metal substance A reaches a portion of the head top portion of the metallic member 106 in which the electric field is high, whereby it becomes more difficult to trap the foreign metal substance. However, in the first embodiment, as illustrated in FIGS. 4 and 5, the sidewall 5c is formed to be almost orthogonal to the head top portion 5a, so that distortion of the electric field that occurs when the end portion 106a is rounded can be prevented.

In a second embodiment of the present invention, the trap apparatus 5 is manufactured from one metal plate by a press process. A shearing process and a bending process are performed using a press process, so that a shape having a complicated cross-section can be easily formed, the manufacturing process time can be reduced, and manufacturing costs can be reduced. Accordingly, it becomes easy to manufacture a large-sized trap apparatus, and as such, the grounded tank 2 can be installed over a greater area, whereby the trapping rate of foreign metal substances can be increased.

Because the trap apparatus 5 can be manufactured from a thin metal plate by a press process, it is lightweight and easy to handle. Even in the case in which the trap apparatus 5 is installed in the large-sized grounded tank 2, because of its light weight, it can be easily attached to the existing grounded tank 2 without any need for additional labor. The chance of a flashover accident caused by a foreign metal substance can be reduced, and the foreign metal substance is easy to separate, so that any trapped foreign metal substance can be easily gathered, and a test of the fluid-insulated electrical apparatus (for example, a gas insulated electrical apparatus) can be easily performed.

In the case of using a press process, because a shearing process and a bending process are performed using a press process, the sidewalls 5c and the inclined portions 5b can be simultaneously formed. In FIG. 5, the length L of the inclined portion 5b is larger than the groove width Ws. This is because the inclined portion 5b is sheared from a metal plate and is stretched while the bending process is being performed.

Figure 8:
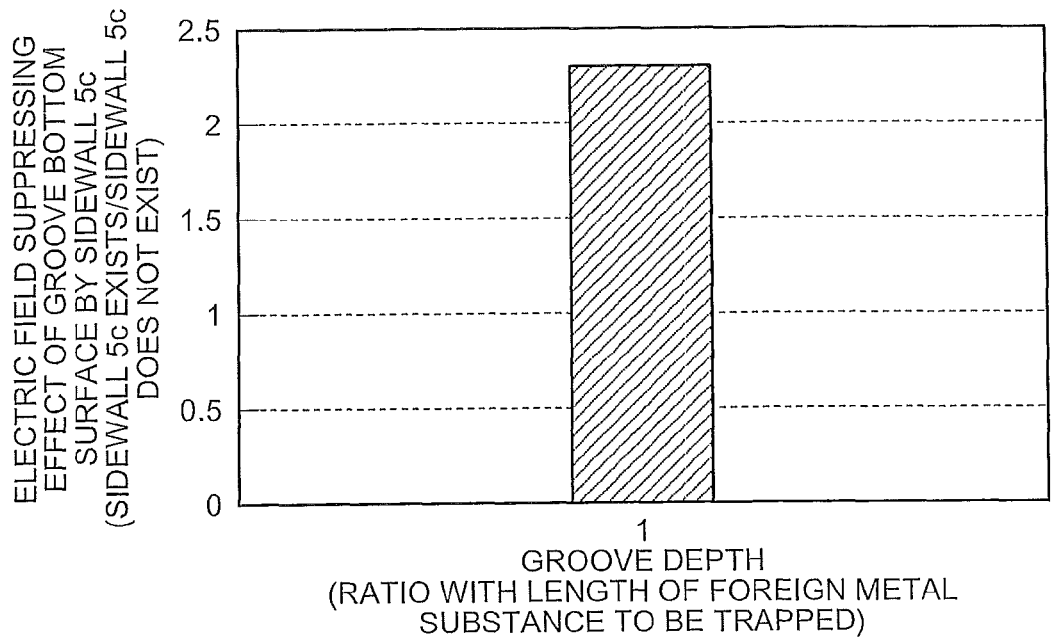
FIG. 8 is a graph illustrating the electric field suppressing effect at a groove bottom according to the formation of a sidewall.
Figure 9:
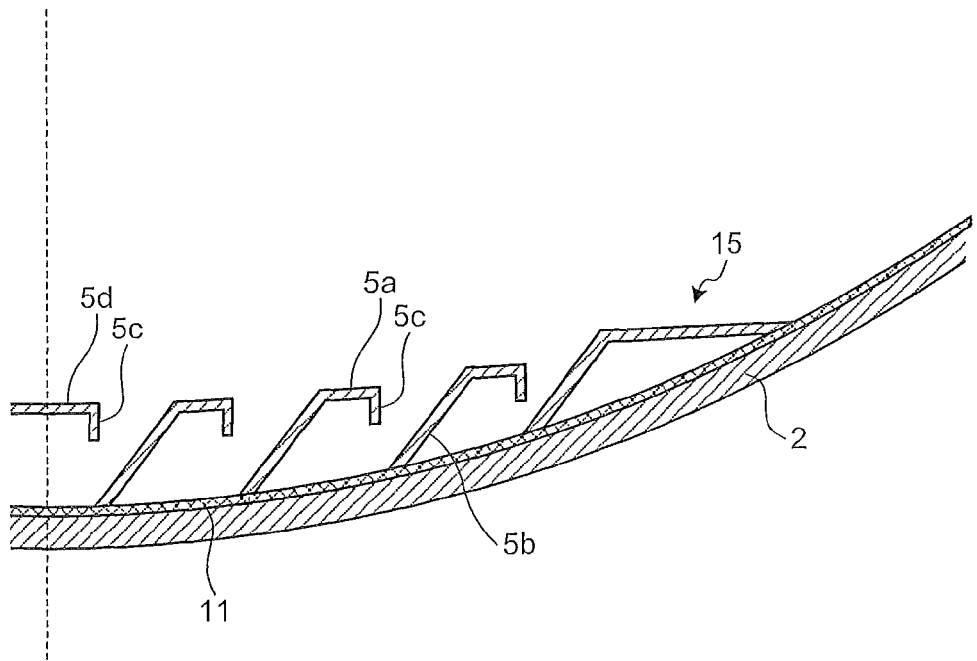
FIG. 9 is an enlarged front of a fluid-insulated electrical apparatus in which a trap apparatus is installed on a grounded tank on which an insulating material is coated according to a third embodiment of the present invention.

When compared to the case in which the sidewall 5c is not formed, in the case in which the sidewall 5c is formed, due to the shield effect, an extremely low electric field can be formed inside the groove, and an electric field at the groove bottom can be lowered, whereby the trapping efficiency can be easily increased. FIG. 8 is a graph illustrating an electric field suppressing effect at the groove bottom because of the formation of the sidewall 5c, and an electric field at the groove bottom when the sidewall 5c is formed is compared to that when the sidewall 5c is not formed. FIG. 8 also illustrates an electric field analysis result when a length of the sidewall 5c of the trap apparatus 5 is one third (⅓) of the groove depth. The vertical axis denotes an electric field ratio (when the sidewall 5c exists) at the groove bottom when the sidewall 5c is formed and an electric field ratio (when the sidewall 5c does not exist) at the groove bottom when the sidewall 5c is not formed, and the horizontal axis denotes the ratio between the length of a foreign metal substance to be trapped and the groove width H. FIG. 8 illustrates, as one example, an electric field suppressing effect when the groove width H is identical to the length (being the length in the longitudinal direction) of a foreign metal substance. A case in which an electric field suppressing effect at the groove bottom by the sidewall 5c is 1 means that there is no effect at the sidewall 5c, and as it becomes larger than 1, the electric field suppressing effect increases. It is found through the present electrolytic analysis result that an electric field suppressing effect of about 2.3 was obtained. That is, it is understood that an electric field suppressing effect is improved when the sidewall 5c is formed. In FIG. 5, the groove depth H is illustrated. The sidewall 5c also serves as a wall that isolates the foreign metal substance and prevents the foreign metal substance from coming out of the groove again.

Sometimes it can be difficult to trap a foreign metal substance due to repulsive forces received from the grounded tank 2. In the case of the conventional art, when the depth of the groove is identical to the length of the foreign metal substance to be trapped, it is difficult to trap the foreign metal substance, and thus the groove needs to have a depth greater than or equal to the length of the foreign metal substance to be trapped. In the second embodiment, because the electric field at the groove bottom can be reduced by forming the inclined portion 5b and the sidewall 5c even though a groove depth is not too deep, as illustrated in FIG. 8, the groove depth H can be set to a depth that is identical to the length of the foreign metal substance.

Also, the length of the sidewall 5c does not depend on the groove width due to the press process technique and can be freely controlled to some extent. The sidewall 5c can be easily formed by a shearing process and a bending process using the press process, and as illustrated in FIGS. 5 and 8, when the length of the sidewall 5c is one third (⅓) of the groove depth, the effect according to the formation of the sidewall 5c is increased. Therefore, there is no need to set the length of the sidewall 5c to be a length that is equal to the groove depth H.

Figure 3B:
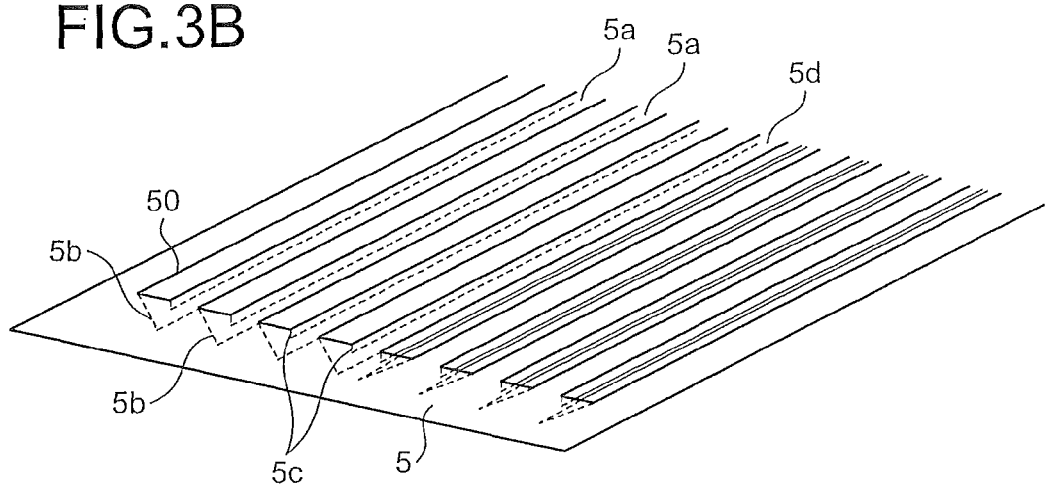

A fluid-insulated electrical apparatus according to a third embodiment of the present invention is described below. In the fluid-insulated electrical apparatus according to the third embodiment, an insulating coating material 11 is provided on an inner surface of the grounded tank 2, and the trap apparatus 5 is installed on insulating coating material 11. FIG. 2B is a front cross-sectional view of the fluid-insulated electrical apparatus according to the third embodiment, and FIG. 3B is a perspective view of the trap apparatus 5 in the fluid-insulated electrical apparatus according to the third embodiment. In the third embodiment, in addition to the configuration of the first embodiment, the trap apparatus 5 is installed on the grounded tank 2 whose inner surface is coated with the insulating coating material 11. However, a portion of the grounded tank 2 that is electrically connected to the trap apparatus 5 is not coated with the insulating coating material 11. Also, for the head top portions 5a disposed on both ends (being both ends of a direction perpendicular to the direction in which the groove is stretched or both ends of the circumferential direction) of the trap apparatus 5, the sidewall 5c is not formed at one end of the head top portion 5a, and thus a groove is not formed between one end of the head top portion 5a at the side opposite to the side which is connected to the inclined portion 5b and the inner wall of the grounded tank 2.

In reality, it is difficult to exchange electrostatic charges between a foreign metal substance that moves on the inner surface of the grounded tank 2 that is coated with the insulating coating material 11 and the grounded tank 2, and thus the foreign metal substance's movement is not easily suppressed. However, in the third embodiment, due to the above-described configuration, the foreign metal substance loses its electrostatic charge in the trap apparatus 5 which is electrically connected to the grounded tank 2 and any movement in the vertical direction is transformed into a movement in the horizontal direction by the inclined portion 5b, and so a foreign metal substance which enters the groove collides with the back surface of the inclined portion 5b and reaches the inner surface of the grounded tank 2 which is coated with the insulating coating material 11. An electric field that can provide levitation force to a foreign metal substance is not formed on the inner surface because the electric field is blocked by the trap apparatus 5. Also, because the inner surface is coated with an insulating material, an electrostatic charge is not supplied from the grounded tank 2, and the foreign metal substance can no longer levitate.

Also, due to the structure in which one end 15 (being the end in a direction perpendicular to the direction in which a groove is stretched or an end in the circumference direction) of the trap apparatus 5 comes in contact with the inner wall of the grounded tank 2, which is coated with the insulating coating material 11, any foreign metal substance which exists in the grounded tank 2 is, as much as possible, initially positioned on a surface of the trap apparatus 5 which is not coated with an insulating material. Therefore, the foreign metal substance can be moved in a low electric field and rapidly induced into the groove of the trap apparatus 5, whereby the foreign metal substance can be trapped with a high degree of certainty.

However, a gas-insulated electrical apparatus of high reliability can be obtained by just adding the trap apparatus 5 of the third embodiment without particularly changing anything because the inner surface of gas insulated electrical apparatuses that have been widely employed are commonly coated with the insulating coating material 11. Insulation resistance performance is improved by coating the inner wall of the grounded tank 2 with the insulating coating material 11 and installing the trap apparatus 5, and thus the resultant gas-insulated electrical apparatus can be made smaller and can be manufactured at a lower manufacturing cost, when compared to the conventional gas insulated electrical apparatus.

In a fourth embodiment of the present invention, preferred values of the width Wr of the head top portion 5a, the width Ws (that is, the groove width) between the adjacent head top portions 5a, the length L of the inclined surface of the inclined portion 5b, the bending angle θ (an angle of the inclined portion 5b inclined from the head top portion 5a), the groove depth H (that is, the shortest distance H between the surface of the head top portion 5a which faces the inner surface of the grounded tank 2 and the inner surface of the grounded tank 2) which are set to trap the foreign metal substances 21 and 22 will be described (see FIG. 5). In this instance, Wp denotes the maximum length of the foreign metal substances 21 and 22 which exist in the grounded tank 2.

In the fourth embodiment, the trap apparatus 5 is designed to satisfy Wr≦Ws and Wp≦H as well as Wp≦Ws, which is a condition set in the first embodiment.

The foreign metal substances 21 and 22 in the grounded tank 2 are electrically charged by a voltage applied to the conductor 1 and start to move in a vertical direction. At this time, when the trap apparatus 5 exists between the conductor 1 and the grounded tank 2, the foreign metal substances 21 and 22 move vertically above the surface of the trap apparatus 5 at a cycle of several hertz (Hz). At this time, if the groove width of the trap apparatus 5 and the width of the head top portion 5a are equal to each other, the foreign metal substances 21 and 22, which move vertically, have an equal possibility of contacting each other. Therefore, in order to improve the possibility that the foreign metal substances 21 and 22 will enter the groove, the width Wr of the head top portion 5a needs to be less than or equal to the groove width Ws, i.e., Wr≦Ws. Also, the movement of the foreign metal substances 21 and 22 is not always limited to the vertical direction, and the foreign metal substances 21 and 22 sometimes rotate. In order to trap the foreign metal substances 21 and 22 which perform such movements, the groove width Ws and the maximum length Wp of the foreign metal substances 21 and 22 need to be set to Wp≦Ws. Also, the width H needs to be greater than, at least, the maximum length of the foreign metal substances 21 and 22, i.e., Wp≦H. This is because when the foreign metal substances 21 and 22 stand up in the groove of the trap apparatus 5, if their front ends rush away from the surface of the trap apparatus 5, the electric field at the front end becomes high, and the foreign metal substances can thereby obtain a levitation force.

In the fourth embodiment, the length L of the inclined portion 5b is designed to satisfy "L=Ws/cos θ".

In particular, it is preferable that the bottom of the groove is not flat; because, if the foreign metal substances 21 and 22, which are vertically moving in a standing state, collide with a flat portion such as the head top portion 5a, they fly vertically toward the side opposite to the trap apparatus 5, that is, toward the conductor 1. Therefore, the inclined portion 5b preferably extends up to the end portion of the groove so that a flat portion cannot be seen when the trap apparatus 5 is seen from the top, i.e., L=Ws/cos θ.

A relationship suitable for the groove width Ws, the width Wr of the head top portion 5a, and the groove depth H of the trap apparatus 5 is determined using the maximum length Wp of the foreign metal substances 21 and 22, which exist in the grounded tank 2.

As described above, the possibility that the foreign metal substances 21 and 22 will enter the groove can be improved by making the groove width Ws wider than the width Wr of the head top portion 5a of the metal plate. The foreign metal substances 21 and 22, which drop vertically, can drop down to a low electric area by making the groove width H greater than or equal to the maximum length Wp of the foreign metal substance, whereby the trapping efficiency can be improved.

The dropped foreign metal substances 21 and 22 can be prevented from directly colliding with the inner surface of the grounded tank 2 and rushing out toward the conductor 1 by projectedly connecting the head top portion 5a and the inclined portion 5b of the metal plate when the trap apparatus 5 is seen from the top, whereby the efficiency for trapping the foreign metal substances 21 and 22 through the trap apparatus 5 does not deteriorate.

In a fifth embodiment of the present invention, an adhesive material (not illustrated) is coated on the back surface of the trap apparatus 5. In particular, an adhesive material is coated on surfaces (referred to as back surfaces) of the inclined portion 5b and the head top portions 5a which face the inner surface of the grounded tank 2, and a surface (referred to as a back surface) of the sidewall 5c which faces the back surface of the inclined portion 5b. That is, the back surface of the trap apparatus 5 means a surface of the trap apparatus 5 at the trapping area side.

In the case in which the electric field of the inner surface of the grounded tank 2 is high, if the foreign metal substances 21 and 22 which are not trapped by the trap apparatus 5 start to move, the movement speed of the foreign metal substances 21 and 22 becomes very fast in proportion to the electric field. In this case, there is a possibility that the mechanical repulsive force is increased due to their speed rates, and thus the foreign metal substances 21 and 22 that enter the groove of the trap apparatus 5 can be returned into the grounded tank 2 by means of the groove.

However, if an adhesive material is coated only on the back surface of the trap apparatus 5 as in the fifth embodiment, if a movement in the horizontal direction is transformed by the inclined portion 5b and collides with the back side of the inclined portion 5b, a large amount of momentum is absorbed by the coated adhesive material, and thus the movement can be suppressed.

Because of the above-described configuration, for the foreign metal substances 21 and 22, which have a speed that makes the foreign metal substance come out of the trap apparatus 5, an adhesive material is coated on the back surface of the trap apparatus 5, and thus any momentum of the foreign metal substances 21 and 22 can be absorbed by the adhesive material and the foreign metal substances can be trapped by its adhesive force.

Also, because a bouncing phenomenon caused by the repulsive force does not occur due to the adhesive material, the height H (that is, the groove depth H) of the trap apparatus 5 can be reduced, and the trap apparatus 5 of the fifth embodiment can be installed in a fluid-insulated electrical apparatus in which the distance between the conductor 1 and the grounded tank 2 is short.

Also, even though the adhesive material loses its effect due to aging, because the foreign metal substances 21 and 22 exist in the groove, which is an area (that is, the inclined portion 5b, the head top portion 5a and the sidewall 5c) surrounded by the sidewall and has a low electric field, the force which makes the foreign metal substance levitate out of the groove is not generated.

Figure 10:
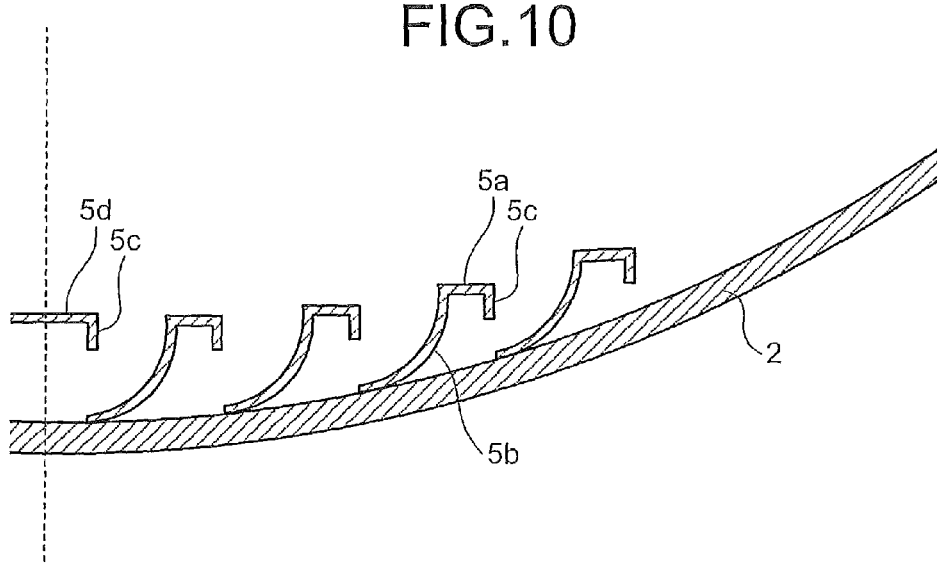
FIG. 10 is an enlarged front view of a trap apparatus according to a fifth embodiment of the present invention.

In FIGS. 2A and 2B, the inclined surface of the inclined portion 5b of the trap apparatus 5 has a plane shape (a straight line shape in the front view), but a curvature can be imparted to the portion. FIG. 10 is a cross-sectional view illustrating the trap apparatus 5 according to a sixth embodiment of the present invention, and FIG. 3C is a perspective view of the trap apparatus 5 according to the sixth embodiment.

Figure 3C:
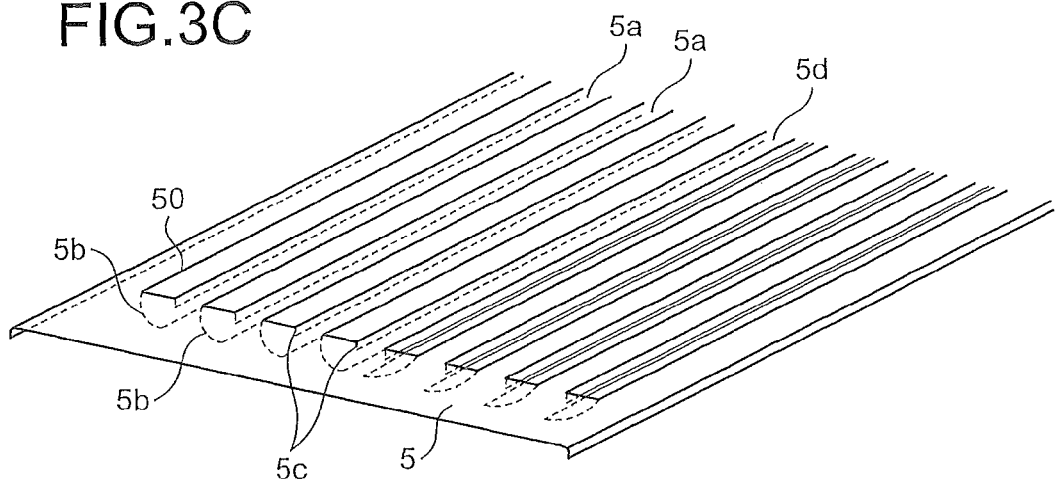

As illustrated in FIGS. 10 and 3C, in the trap apparatus 5 obtained by a press process according to the sixth embodiment, the shape of the head top portion 5a is identical to that in the first embodiment, but a curvature is imparted to the inclined surface of the inclined portion 5b.

In the sixth embodiment, because a curvature is imparted so that the inclined portion 5b can be a part of a circular arc, when the levitated foreign metal substances 21 and 22 drop and enter the groove, the foreign metal substances 21 and 22 drop along the inclined portion 5b which is a curved surface. Therefore, efficiency for transforming any movement of the dropping foreign metal substances 21 and 22 from the vertical direction to the horizontal direction is increased, and the foreign metal substances 21 and 22 can be induced with a high degree of certainty to enter a low electric field area in which the foreign metal substances cannot levitate again, that is, an area formed between the trap apparatus 5 and the grounded tank 2.

According to the sixth embodiment, a curvature is imparted to the inclined surface of the inclined portion 5b of the trap apparatus 5, and thus the foreign metal substances 21 and 22 can be easily induced to enter a low electric field area. Therefore, like the first embodiment, a fluid-insulated electrical apparatus that exhibits excellent insulation durability can be easily configured at a low cost. In particular, the sixth embodiment can be configured by just adding the trap apparatus 5 without changing the basic structure of a conventional gas insulated electrical apparatus that does not include the trap apparatus 5, and thus the fluid-insulated electrical apparatus can be easily manufactured at a low cost.

Also, because the size of the grounded tank 2 is not increased even though the trap apparatus 5 is provided, a compact gas insulated electrical apparatus can be configured.

According to an aspect of the present invention, there are advantages that the distortion of an electric field which occurs when one end of a metallic material which faces an energization conductor is rounded is reduced, and a foreign metal substance in the grounded tank is efficiently trapped with a high degree of certainty so that the foreign metal substance becomes harmless, thereby preventing the withstanding voltage performance from deteriorating while simplifying the installation process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A fluid-insulated electrical apparatus comprising:
a grounded tank;
an energization conductor that is disposed in the grounded tank and electrically insulated from the grounded tank; and
a trap member that is arranged on a lower inner surface of the grounded tank so as to be electrically connected to the grounded tank and traps a foreign metal substance, the trap member includes
a head top portion of a flat plate shape which is formed along the inner surface and is adjacent to a groove portion; and
an inclined portion which is connected to one end of the head top portion, is inclined relative to the head top portion, forms a Japanese character "⌢"-shaped cross section together with the head top portion, and has a lower end portion which contacts the inner surface of the grounded tank.

2. The fluid-insulated electrical apparatus according to claim 1, wherein the trap member is formed from one metal plate.

3. The fluid-insulated electrical apparatus according to claim 1, wherein the width of the groove portion is within the range of 0.2 mm to 40 mm.

4. The fluid-insulated electrical apparatus according to claim 3, wherein the width of the groove portion is within the range of 0.7 mm to 15 mm.

5. The fluid-insulated electrical apparatus according to claim 1, wherein the trap member comprises a plurality of groove portions formed along the circumferential direction of the grounded tank.

6. The fluid-insulated electrical apparatus according to claim 1, wherein a portion of the trap member which is not electrically connected to the grounded tank is disposed on a portion of the inner surface which is coated with an insulating material.

7. The fluid-insulated electrical apparatus according to claim 1, wherein an end portion of the circumferential direction of the trap member contacts the inner surface of the grounded tank.

8. The fluid-insulated electrical apparatus according to claim 1, wherein the trap member is configured to satisfy $$Wr \leq Ws \text{ and } Wp \leq H$$

where Wp denotes a maximum length of the foreign metal substance, Ws denotes a groove width of the groove portion, Wr denotes a width of the head top portion, and H denotes a distance between the head top portion and the inner surface of the grounded tank.

9. The fluid-insulated electrical apparatus according to claim 1, wherein the trap member is configured to satisfy $$L = Ws/\cos\theta$$

where L denotes a length of an inclined surface of the inclined portion, θ denotes an angle of inclination of the inclined surface relative to the head top portion, and Ws denotes a groove width of the groove portion.

10. The fluid-insulated electrical apparatus according to claim 1, wherein an end portion of the head top portion which is opposite to a side connected to the inclined portion is bent downward to form a sidewall portion.

11. The fluid-insulated electrical apparatus according to claim 10, wherein an adhesive material is coated on a surface of the inclined portion at a side which faces the inner surface of the grounded tank and a surface of the head top portion at a side which faces the inner surface of the grounded tank, and an adhesive material is coated on a surface of the sidewall portion which faces the inclined surface coated with the adhesive material.

12. The fluid-insulated electrical apparatus according to claim 1, wherein an inclined surface of the inclined portion has a curvature.

13. The fluid-insulated electrical apparatus according to claim 1, wherein the trap member is formed from the metal plate by a press process.

14. A fluid-insulated electrical apparatus comprising:
a grounded tank;
an energization conductor that is disposed in the grounded tank and electrically insulated from the grounded tank; and
a trap member that is arranged on a lower inner surface of the grounded tank so as to be electrically connected to the grounded tank and traps a foreign metal substance, the trap member includes
an inclined portion which is formed to be bent downward by at least cutting and raising one metal plate disposed on the inner surface, contacts the inner surface of the grounded tank and extends in a central axis direction of the grounded tank; and
a head top portion which is connected to an upper end of the inclined portion, is part of the metal plate which is not cut and raised, forms a Japanese character "ᴧ"-shaped cross section together with the inclined portion, and is adjacent to a groove portion formed according to formation of the inclined portion.

15. The fluid-insulated electrical apparatus according to claim 14, wherein the width of the groove portion is within the range of 0.2 mm to 40 mm.

16. The fluid-insulated electrical apparatus according to claim 15, wherein the width of the groove portion is within the range of 0.7 mm to 15 mm.

17. The fluid-insulated electrical apparatus according to claim 14, wherein the trap member comprises a plurality of groove portions formed along the circumferential direction of the grounded tank.

18. The fluid-insulated electrical apparatus according to claim 14, wherein a portion of the trap member which is not electrically connected to the grounded tank is disposed on a portion of the inner surface which is coated with an insulating material.

19. The fluid-insulated electrical apparatus according to claim 14, wherein an end portion of the circumferential direction of the trap member contacts the inner surface of the grounded tank.

20. The fluid-insulated electrical apparatus according to claim 14, wherein the trap member is configured to satisfy $$Wr \leq Ws \text{ and } Wp \leq H$$

where $Wp$ denotes a maximum length of the foreign metal substance, $Ws$ denotes a groove width of the groove portion, $Wr$ denotes a width of the head top portion, and $H$ denotes a distance between the head top portion and the inner surface of the grounded tank.

21. The fluid-insulated electrical apparatus according to claim 14, wherein the trap member is configured to satisfy $$L = Ws/\cos\theta$$

where $L$ denotes a length of an inclined surface of the inclined portion, $\theta$ denotes an angle of inclination of the inclined surface relative to the head top portion, and $Ws$ denotes a groove width of the groove portion.

22. The fluid-insulated electrical apparatus according to claim 14, wherein an end portion of the head top portion which is opposite to a side connected to the inclined portion is bent downward to form a sidewall portion.

23. The fluid-insulated electrical apparatus according to claim 22, wherein an adhesive material is coated on a surface of the inclined portion at a side which faces the inner surface of the grounded tank and a surface of the head top portion at a side which faces the inner surface of the grounded tank, and an adhesive material is coated on a surface of the sidewall portion which faces the inclined surface coated with the adhesive material.

24. The fluid-insulated electrical apparatus according to claim 14, wherein an inclined surface of the inclined portion has a curvature.

25. The fluid-insulated electrical apparatus according to claim 14, wherein the trap member is formed from the metal plate by a press process.

* * * * *